(12) United States Patent
Yamaguchi et al.

(10) Patent No.: US 10,361,011 B2
(45) Date of Patent: Jul. 23, 2019

(54) WRAPPED TEXTILE SLEEVE WITH BONDED CLOSURE MECHANISM AND METHOD OF CONSTRUCTION THEREOF

(71) Applicant: FEDERAL-MOGUL POWERTRAIN LLC, Southfield, MI (US)

(72) Inventors: Hiroki Yamaguchi, Kanagawa (JP); Takuto Maeda, Kanagawa (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 219 days.

(21) Appl. No.: 15/255,661

(22) Filed: Sep. 2, 2016

(65) Prior Publication Data

US 2016/0372903 A1    Dec. 22, 2016

Related U.S. Application Data

(62) Division of application No. 14/288,795, filed on May 28, 2014, now Pat. No. 9,633,758.

(Continued)

(51) Int. Cl.
| | |
|---|---|
| *H01B 7/17* | (2006.01) |
| *H02G 3/04* | (2006.01) |
| *H01B 13/26* | (2006.01) |

(52) U.S. Cl.
CPC ............. *H01B 7/17* (2013.01); *H01B 13/26* (2013.01); *H02G 3/0481* (2013.01); *Y10T 428/1362* (2015.01)

(58) Field of Classification Search
USPC ......... 156/192, 184, 185; 428/36.1, 68, 166, 428/41.8, 195.1
See application file for complete search history.

(56) References Cited

U.S. PATENT DOCUMENTS

| | | | |
|---|---|---|---|
| 2,424,315 A | 7/1947 | Hyatt et al. | |
| 6,531,514 B2* | 3/2003 | Carney | ..... D01F 1/10 |
| | | | 106/463 |

(Continued)

FOREIGN PATENT DOCUMENTS

| | | |
|---|---|---|
| CA | 2309857 A1 | 10/1999 |
| CN | 101405529 A | 4/2009 |

(Continued)

*Primary Examiner* — Lynda Salvatore
(74) *Attorney, Agent, or Firm* — Robert L. Stearns; Dickinson Wright, PLLC

(57) ABSTRACT

A wrapped textile sleeve for protecting an elongate member and method of construction thereof is provided. The sleeve includes an inner layer having opposite inner edges extending lengthwise between opposite inner ends. The opposite inner edges are laterally spaced from one another by an inner width. The sleeve further includes an outer layer having opposite outer edges extending lengthwise between opposite outer ends. The opposite outer edges are laterally spaced from one another by an outer width. An adhesive intermediate layer is sandwiched between the inner layer and the outer layer, wherein a melted portion of the adhesive intermediate bonds the inner layer to the outer layer. The adhesive intermediate layer extends beyond at least one of the inner edges to provide an exposed region of the adhesive intermediate layer. The exposed region is bonded to the outer layer and maintains the outer layer in a wrapped, tubular configuration.

8 Claims, 5 Drawing Sheets

Related U.S. Application Data

(60) Provisional application No. 61/828,122, filed on May 28, 2013.

(56) References Cited

U.S. PATENT DOCUMENTS

| | | |
|---|---|---|
| 2006/0185872 A1 | 8/2006 | Rodrigues et al. |
| 2007/0166495 A1 | 7/2007 | Sellis et al. |

FOREIGN PATENT DOCUMENTS

| | | |
|---|---|---|
| DE | 202007012475 U1 | 1/2009 |
| DE | 202009012475 U1 | 12/2009 |
| EP | 2034576 A | 3/2009 |
| FR | 2853148 A1 | 10/2004 |
| JP | S505921 A | 1/1975 |
| JP | S648798 U | 1/1989 |
| JP | 2002510775 A | 4/2002 |
| JP | 2006335395 A | 12/2006 |

* cited by examiner

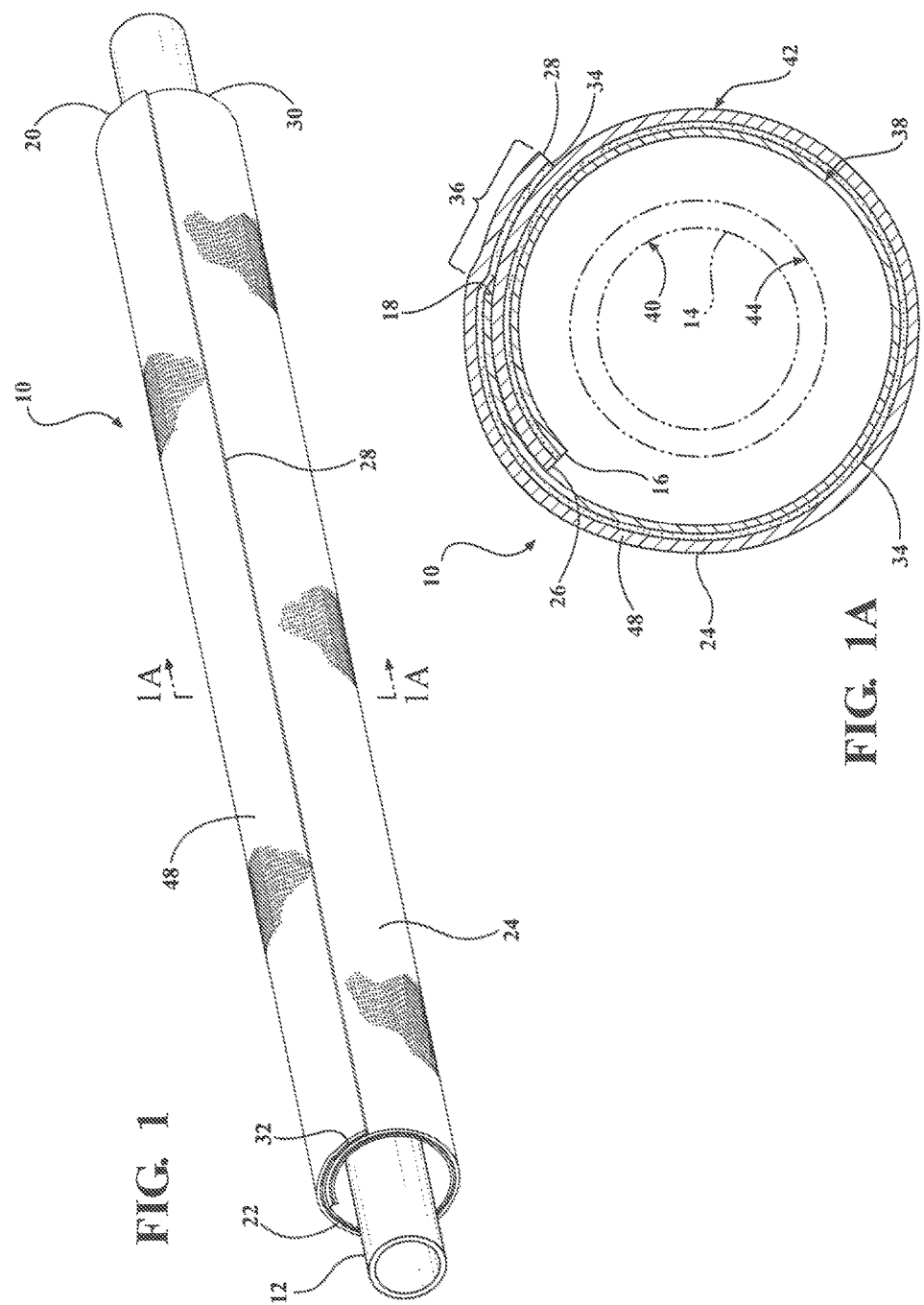

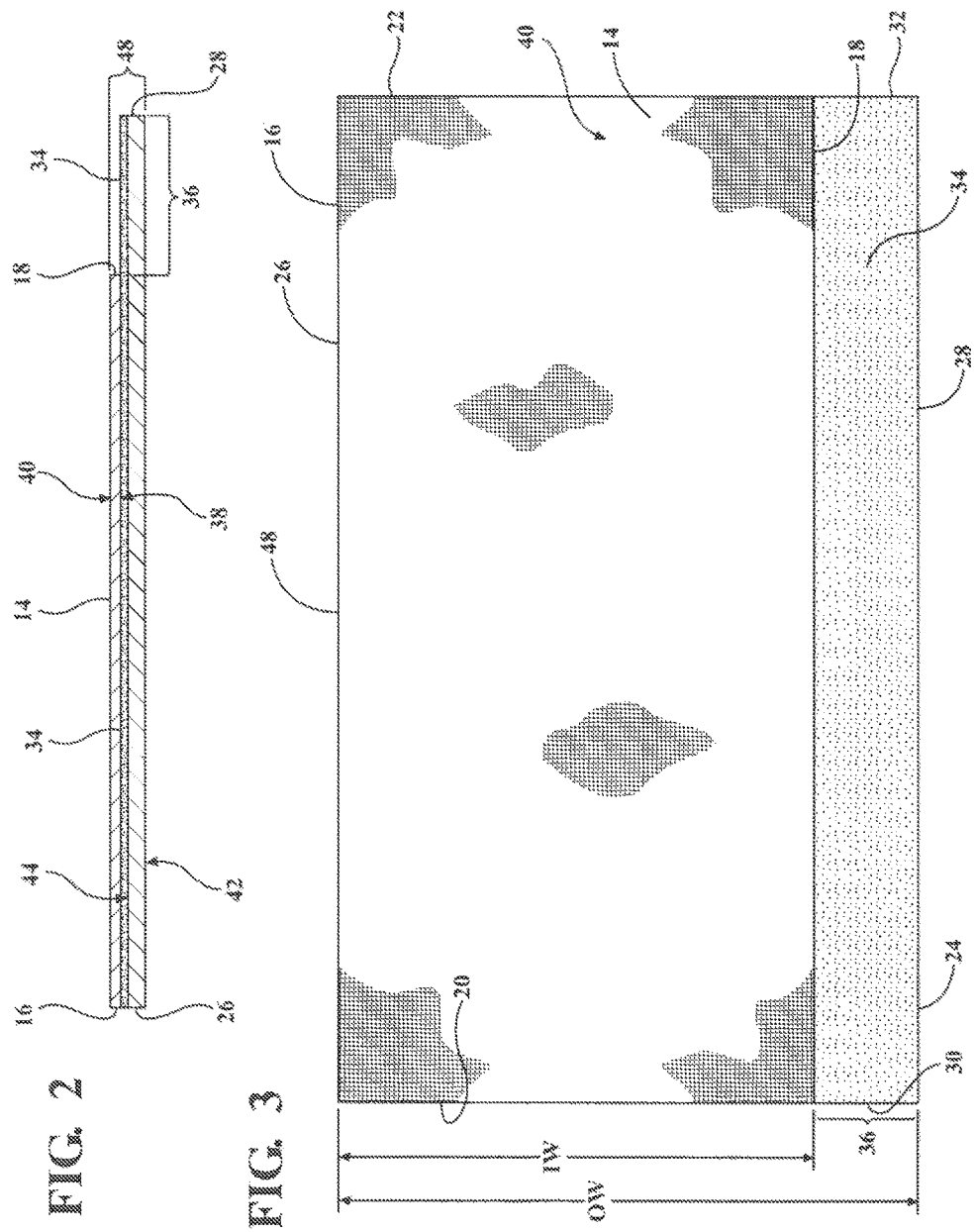

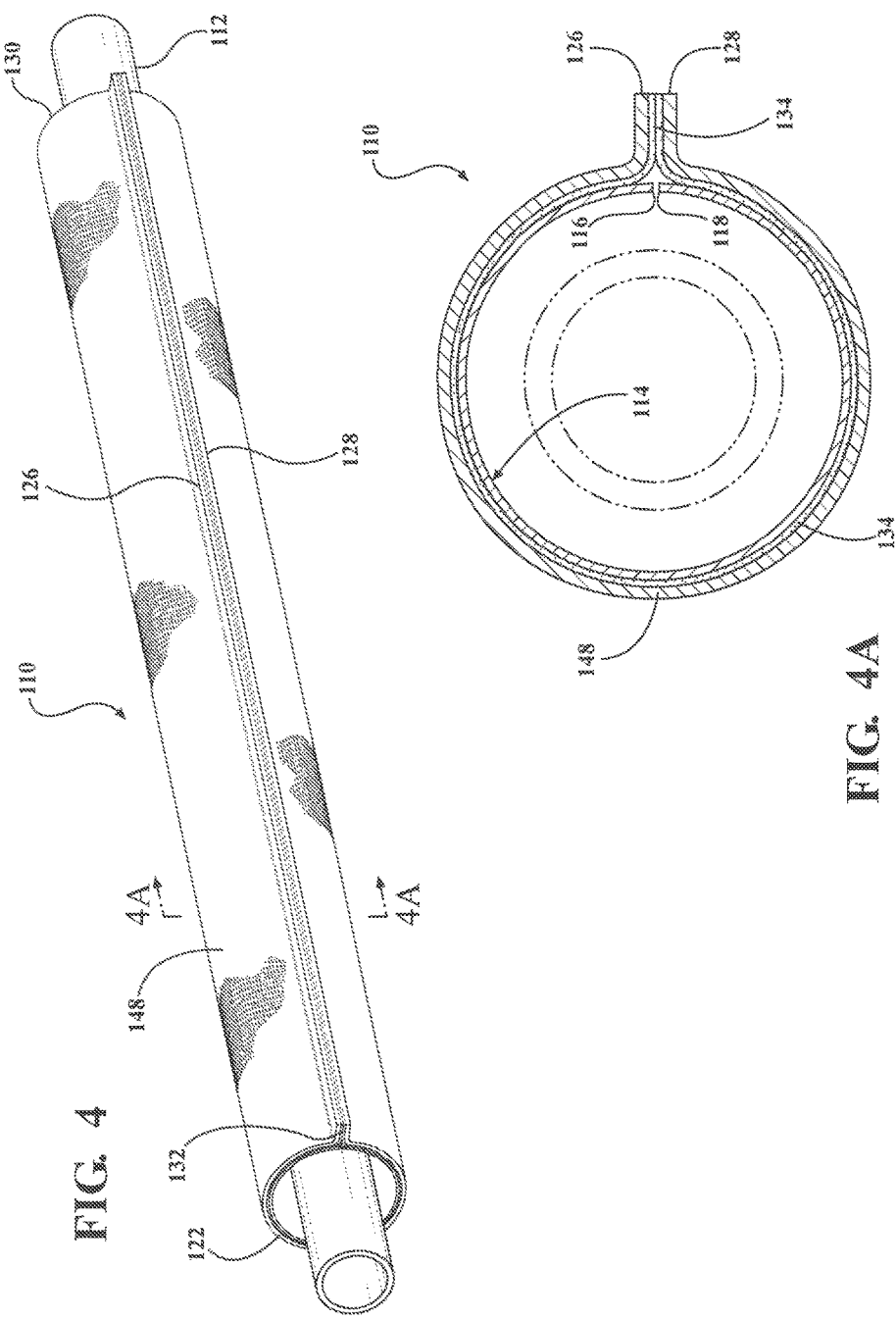

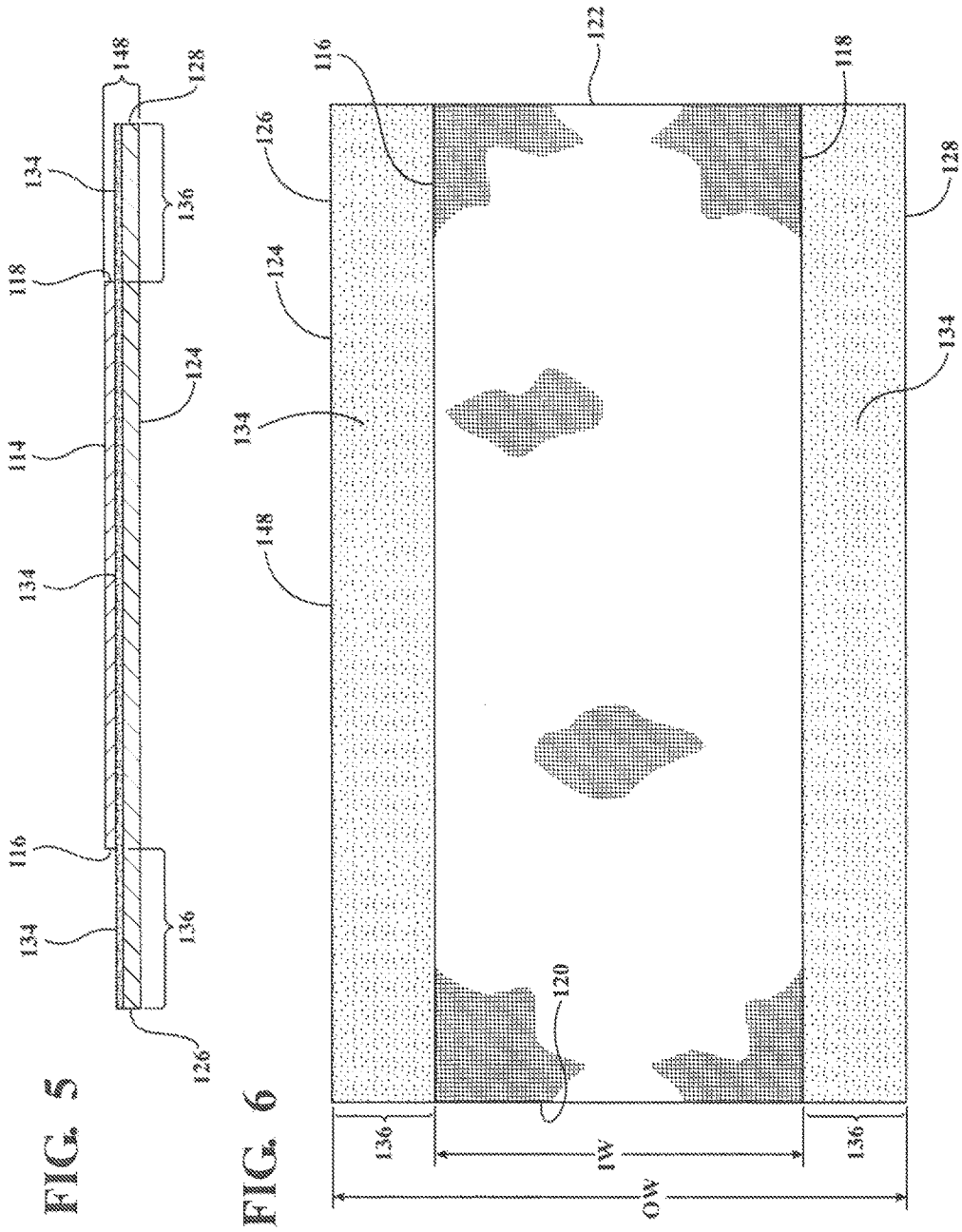

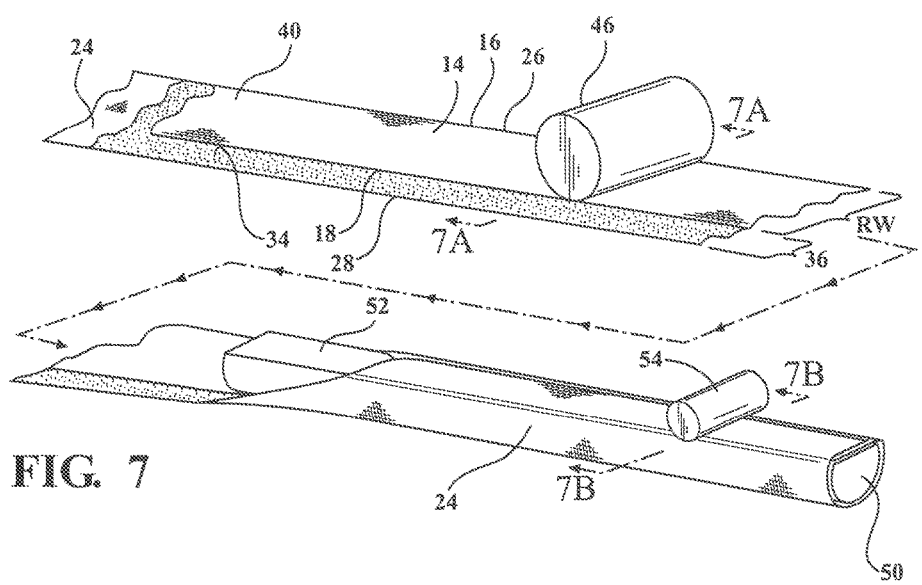
FIG. 7
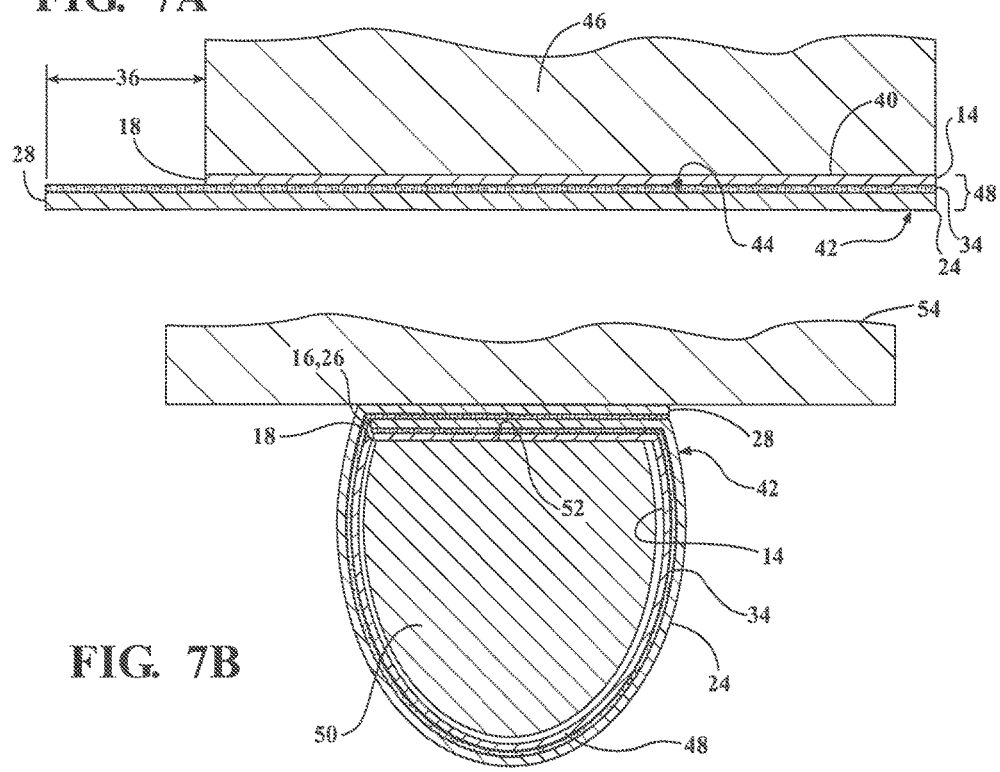
FIG. 7A
FIG. 7B

WRAPPED TEXTILE SLEEVE WITH BONDED CLOSURE MECHANISM AND METHOD OF CONSTRUCTION THEREOF

CROSS-REFERENCE TO RELATED APPLICATION

This divisional application claims the benefit of U.S. Utility application Ser. No. 14/288,795, filed May 28, 2014, now U.S. Pat. No. 9,633,758 and U.S. Provisional Application Ser. No. 61/828,122, filed May 28, 2013, which are incorporated herein by reference in their entirety.

BACKGROUND OF THE INVENTION

1. Technical Field

This invention relates generally to protective sleeves for providing protection to elongate members contained therein, and more particularly to wrappable protective textile sleeves and to their method of construction.

2. Related Art

It is known to dispose protective sleeves about wire harnesses to protect the wire harnesses against at least one of contamination, abrasion, thermal affects, vibration and noise. Of the known sleeves, some are provided as dual layer sleeves having a circumferentially continuous inner layer (also referred to as "closed"), which is first slipped along a longitudinally axis of the wire harness over the elongate wire harness, and then an outer layer is wrapped circumferentially about the inner layer to provide dual layer protection. Although these sleeve can provide the desired protection to the contained wire harness, they are labor intensive to assemble about the wire harness, and thus, costly.

In addition to the aforementioned dual layer sleeve, it is also known to wrap a single layer about a wire harness, and then upon wrapping the sleeve about the wire harness, wrapping strips of tape about a plurality of locations along the length of the sleeve to maintain the sleeve in its wrapped configuration. Although these sleeves can provide suitable protection, they are costly due to the need to wrap the plurality of tape strips about the sleeve, and further, can ultimately result in contamination finding its way into the sleeve between the adjacent strips of tape.

Further, it is known to wrap a plurality of nonwoven layers laminated to one another about a wire harness, wherein the nonwoven layers are the same size as one another and are laminated in mirrored relation, thereby having flush edges about their entire peripheries. Although these sleeves can provide the protection desired, the plurality of nonwoven layers provide the sleeve with an increased wall thickness, particularly across the overlapped edges that have four layers abutting one another. As such, these sleeves require an increased amount of space, which can be problematic when real-estate is at a premium.

SUMMARY OF THE INVENTION

In accordance with one aspect of the invention, a wrappable textile sleeve for protecting an elongate member is provided. The sleeve includes an inner layer having opposite inner edges extending lengthwise between opposite inner ends. The opposite inner edges are laterally spaced from one another by an inner width of the inner layer. The sleeve further includes an outer layer having opposite outer edges extending lengthwise between opposite outer ends. The opposite outer edges are laterally spaced from one another by an outer width of the outer layer. An adhesive intermediate layer is sandwiched between the inner layer and the outer layer and bonds the inner layer to the outer layer. The adhesive intermediate layer extends beyond at least one of the inner edges to provide an exposed region of the adhesive intermediate layer. The exposed region is operably bonded to the outer layer and maintains the outer layer in a wrapped, tubular configuration.

In accordance with another aspect of the invention, one of the inner edges is aligned in flush relation with one of the outer edges.

In accordance with another aspect of the invention, the outer layer has a radially inwardly facing inner surface bonded to the intermediate layer and a radially outwardly facing outer surface, wherein the exposed region of the intermediate layer is bonded to the radially outwardly facing outer surface of the outer layer.

In accordance with another aspect of the invention, the inner layer is an impervious sheet of polymeric material and the outer layer is a nonwoven layer.

In accordance with another aspect of the invention, the inner layer is an impervious sheet of polymeric material and the outer layer is a textile layer of interlaced yarn.

In accordance with another aspect of the invention, the inner layer is a nonwoven material and the outer layer is a nonwoven material.

In accordance with another aspect of the invention, the inner layer is a nonwoven material and the outer layer is a textile layer of interlaced yarn.

In accordance with another aspect of the invention, the adhesive intermediate layer extends beyond both of the inner edges to provide a pair of exposed regions of the adhesive intermediate layer.

In accordance with another aspect of the invention, both of the inner edges are laterally spaced from adjacent outer edges.

In accordance with another aspect of the invention, the pair of exposed regions of the adhesive intermediate layer are bonded to one another.

In accordance with another aspect of the invention, a method of constructing a wrapped sleeve is provided. The method includes providing an inner layer having opposite inner edges extending lengthwise between opposite inner ends; providing an outer layer having opposite outer edges extending lengthwise between opposite outer ends, and then, sandwiching an adhesive intermediate layer between the inner layer and the outer layer to form a sandwiched portion of the adhesive layer and an exposed portion of the adhesive layer that extends beyond at least one of the opposite inner edges of the inner layer. Then, bonding the inner layer to the outer layer by heating the sandwiched portion of the adhesive intermediate layer. Further, wrapping the outer layer about a mandrel to bring the portions of the outer layer adjacent the opposite outer edges into abutting relation with one another, and then, bonding the abutting portions of the wrapped outer layer with one another by heating the exposed portion of the adhesive layer.

In accordance with another aspect of the invention, the method can further include providing the inner layer as an impervious sheet of polymeric material.

In accordance with another aspect of the invention, the method can further include providing the outer layer as a nonwoven layer.

In accordance with another aspect of the invention, the method can further include providing the outer layer as a layer of interlaced yarn.

In accordance with another aspect of the invention, the method can further include providing the inner layer as a nonwoven material.

In accordance with another aspect of the invention, the method can further include providing the outer layer as a nonwoven layer.

In accordance with another aspect of the invention, the method can further include providing the outer layer as a layer of interlaced yarn.

In accordance with another aspect of the invention, the method can further include aligning one of the inner edges in flush relation with one of the outer edges.

In accordance with another aspect of the invention, the method can further include bonding a radially inwardly facing inner surface of the outer layer to the exposed region of the intermediate layer and bonding the exposed region of the intermediate layer to a radially outwardly facing outer surface of the outer layer.

In accordance with another aspect of the invention, the method can further include extending the adhesive intermediate layer beyond both of the inner edges of the inner layer to provide a pair of the exposed regions, and then bonding the pair of exposed regions to one another.

In accordance with another aspect of the invention, the method can further include providing the inner layer with EMI shielding properties.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a perspective view of a sleeve constructed in accordance with one embodiment of the invention shown wrapped about an elongate member;

FIG. 1A is a cross-sectional view taken generally along the line 1A-1A of FIG. 1;

FIG. 2 is a side view of the sleeve of FIG. 1 shown in a unwrapped, flattened configuration;

FIG. 3 is a plan view of the sleeve of FIG. 1 shown in a unwrapped, flattened configuration;

FIG. 4 is a perspective view of a sleeve constructed in accordance with another embodiment of the invention shown wrapped about an elongate member;

FIG. 4A is a cross-sectional view taken generally along the line 4A-4A of FIG. 4;

FIG. 5 is a side view of the sleeve of FIG. 4 shown in a unwrapped, flattened configuration;

FIG. 6 is a plan view of the sleeve of FIG. 4 shown in a unwrapped, flattened configuration;

FIG. 7 illustrates a process for constructing the sleeve in accordance with another aspect of the invention;

FIG. 7A is a cross-sectional view taken generally along line 7A-7A of FIG. 1; and FIG. 7B is a cross-sectional view taken generally along line 7B-7B of FIG. 1.

DETAILED DESCRIPTION OF PRESENTLY PREFERRED EMBODIMENTS

Referring in more detail to the drawings, FIG. 1 illustrates a wrapped and permanently bonded textile sleeve 10, constructed in accordance with one embodiment of the invention, for protecting an elongate member 12, shown as a wire harness, by way of example and without limitation. As best shown in FIG. 3, the sleeve 10 includes an inner layer 14 having opposite inner edges 16, 18 extending lengthwise between opposite inner ends 20, 22. The opposite inner edges 16, 18 are laterally spaced from one another by an inner width (IW) of the inner layer 14. The sleeve 10 further includes an outer layer 24 having opposite outer edges 26, 28 extending lengthwise between opposite outer ends 30, 32. The opposite outer edges 26, 28 are laterally spaced from one another by an outer width (OW) of the outer layer 24. A bondable adhesive intermediate layer 34 is sandwiched between the inner layer 14 and the outer layer 24 and provides a bonding mechanism that permanently bonds the inner layer 14 to the outer layer 24. The adhesive intermediate layer 34 extends laterally beyond at least one of the inner edges 16, 18, shown as the inner edge 18, to provide an exposed region 36 of the intermediate layer 34. The exposed region 36 provides a further bonding mechanism that is permanently bonded directly to the outer layer 24 to maintain the outer layer 24 in a permanently wrapped, tubular configuration, thereby providing complete protection to the elongate member 12 about the entire circumference of the elongate member 12.

The inner layer 14 can be provided as a nonwoven material, such as a thin spun bond nonwoven, an imperforate sheet of polymeric material, such as vinyl, by way of example and without limitation, and/or as a layer having electromagnetic interference (EMI) shielding properties, such as including at least one or more metallic fibers, e.g., coated fibers or wire fibers, for example. The inner layer 14 imparts the sleeve 10 with the ability to provide the desired mechanical protection to the elongate member 12 about the entire circumference of the elongate member 12 and to prevent the ingress of contamination, and thus, it is critical that the inner layer 14 surround the entire circumference of the elongate member 12. The inner layer 14 has a radially outwardly facing outer surface 38 that is operably bonded to the overlying outer layer 24 via the intermediate layer 34 and a radially inwardly facing inner surface 40.

The outer layer 24 can be provided as a nonwoven material, foam (e.g. urethane foam) or as a layer of interlaced yarn, such as a knit, woven, or braided layer. The outer layer 24 imparts the sleeve 10 with the ability to provide noise reduction performance from vibration, and thus, it is desirable that the outer layer 24 have noise dampening properties. The outer layer 24 has a radially outwardly facing outer surface 42 that is exposed to the surrounding environment, with the exception of the portion that is overwrapped, and a radially inwardly facing inner surface 40.

The adhesive intermediate layer 34 is provided as a layer of adhesive material, and preferably as a hot melt adhesive, and it extends over the entirety of an inner surface 44 of the outer layer 24. In order to prevent the adhesive intermediate layer 34 from melting during use, it is preferred to provide the adhesive intermediate layer 34 having a melt point greater than 140 degrees Centigrade, thereby allowing the adhesive intermediate layer 34 to remain unmelted until the desired time to form a bond via the adhesive intermediate layer 34.

In construction of the sleeve 10, as shown in FIG. 7, the adhesive intermediate layer 34 is laid over the entire or substantially entire inner surface 44 of the outer layer 24, and then, the inner layer 14 is laid over the adhesive intermediate layer 34 in a predetermined alignment relative to the adhesive intermediate layer 34. In constructing the sleeve 10 of FIG. 1, the inner edge 16 of the inner layer 14 is aligned in flush or substantially flush relation with the outer edge 26 of the outer layer 24 and, with the inner layer 14 having a width IW (FIG. 3) that is less than the width OW of the outer layer 24, the inner edge 18 is spaced laterally from the outer edge 28 of the outer layer 24 along the entire length of the sleeve 10. Accordingly, an exposed region 36 of the adhesive intermediate layer 34 is formed. Then, the region of the adhesive intermediate layer 34 sandwiched between the inner and outer layers 14, 24 is melted via application of heat above the melt temperature of the adhesive intermediate layer 34, such as via a heated roller 46 applied under load (L) to the inner surface 40 of the inner layer 14, by way of example and without limitation, thereby causing the inner and outer layers 14, 24 to be slightly compressed and permanently bonded to one another via the melted, then cooled and fully bonded adhesive intermediate layer 34. As shown, the heated roller 46 has a width RW the same or substantially the same as the width IW of the inner layer 14, and thus, only the sandwiched region of the adhesive intermediate layer 34 directly beneath the heated roller 46 is caused to melt, thereby leaving the remaining exposed region 36 of the adhesive intermediate layer 34 unmelted and unaffected during bonding of the inner layer 14 to the outer layer 24.

Then, upon bonding the inner layer 14 in permanently fixed relation to the outer layer 24 via the melted and cooled intermediate layer 34, the bonded, multilayered wall 48 of the sleeve 10 is wrapped in "cigarette" fashion about a tool, also referred to as mandrel 50, to bring the outer edges 26, 28 into overlapped relation with one another, such that the outer edges 26, 28 extend beyond one another. The degree of overlap can be adjusted as desired, but it is necessary to ensure that the majority, and preferably entirety, of the exposed region 36 of the adhesive intermediate layer 34 be brought into overlying, abutting relation with the outer surface 42 of the outer layer 24. The mandrel 50 can be provided having a flat or substantially flat surface 52 directly underlying the overlapped region to facilitate melting and bonding the exposed region 36, if desired. Then, with the outer edges 26, 28 in their wrapped and overlapped relation, a heated member, such as a heated roller 54, by way of example and without limitation, is then moved into compression under a predetermined load against the outer surface 42 of the overlapped region of the outer layer 24 and rolled under compression along the full length of the sleeve 10, whereupon the temperature of the exposed region 36 of the adhesive intermediate layer 34 beneath the heated roller 54 is raised above its melt temperature, such as 140 degree Centigrade, by way of example and without limitation, thereby bonding the overlapped regions of the outer layer 24 to one another via the melted and subsequently cooled exposed region 36 of the adhesive intermediate region 34. It should be recognized that the melted region cools as the roller proceeds beyond the melted region. As such, upon the heated roller 54 passing along the entire length of the sleeve 10, the overlapped region is bonded and sealed, thereby preventing the possibility of the ingress of fluid and other forms of contamination. It should be recognized that upon forming the sleeve 10, the inner layer 14 is wrapped to completely surround the circumference of an inner cavity 56 formed by the wall 48 of the sleeve 10, thereby providing optimal mechanical protection to the enclosed elongate member 12. It should be recognized that the finish length of the sleeve 10 can be cut after forming the wrapped and bonded wall 48, or prior to wrapping and bonding the wall 48 over the mandrel 50.

In FIGS. 4-6, a wrapped and bonded sleeve 110 constructed in accordance with another aspect of the invention is shown, wherein the same reference numerals as used above, offset by a factor of 100, are used to identify like features.

As best shown in FIG. 6, the sleeve 110 includes a wall 148 having an inner layer 114 with opposite inner edges 116, 118 extending lengthwise between opposite inner ends 120, 122. The opposite inner edges 116, 118 are laterally spaced from one another by an inner width (I of the inner layer 114. The sleeve 110 further includes an outer layer 124 having opposite outer edges 126, 128 extending lengthwise between opposite outer ends 130, 132. The opposite outer edges 126, 128 are laterally spaced from one another by an outer width (OW) of the outer layer 124. An adhesive intermediate layer 134 is sandwiched between the inner layer 114 and the outer layer 124 and bonds the inner layer 114 to the outer layer 124, similarly as described above for the adhesive intermediate layer 34. The adhesive intermediate layer 134 extends beyond at least one the inner edges 116, 118, and is shown as extending beyond both inner edges 116, 118 to provide a pair of laterally spaced exposed regions 136 of the adhesive intermediate region 134, though it should be recognized that a single exposed region of the adhesive intermediate region 134 could be formed between one pair of the adjacent edges 116, 126, 118, 128 with the opposite exposed region between the other of the adjacent edges 116, 126, 118, 128 initially remaining free of the adhesive intermediate layer 134. While bonding the inner layer 114 to the outer layer 124, the inner layer 114 is centered or substantially centered in relation to the outer layer 124 such that the free edges 126, 128 of the outer layer extend equidistantly or substantially equidistantly beyond the free edges 116, 118 of the inner layer 114. Then, in forming the sleeve 110, the exposed regions 136 are folded toward one another and brought into abutment with one another, whereupon the exposed regions 136 are bonded to one another to maintain the outer layer 124 in a wrapped, tubular configuration. It should be recognized that the exposed regions 136 are bonded to one another via application of suitable heat and pressure, as described above in forming the sleeve 10, to causes the exposed regions 136 to melt and bond with one another, after which the melted material of the intermediate adhesive layer 134 is cooled and permanently bonded. Upon wrapping and operably bonding one free edge portion of the outer layer 124 directly to the opposite free edge portion of the outer layer 124 via the melted and subsequently cooled adhesive intermediate layer 134, the inner layer 114 is caused to be wrapped to form a circumferentially continuous or substantially continuous boundary about an inner cavity 156 in which the elongate member 112 is received and protected.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of constructing a wrapped textile sleeve, comprising:
   providing an inner layer having opposite inner edges extending lengthwise between opposite inner ends;
   providing a nonwoven outer layer having opposite outer edges extending lengthwise between opposite outer ends;
   sandwiching an adhesive intermediate layer between the inner layer and the nonwoven outer layer to form a sandwiched portion of the adhesive layer and an exposed portion of the adhesive layer that extends beyond at least one of the opposite inner edges of the inner layer;

bonding the inner layer to the nonwoven outer layer by heating the sandwiched portion of the adhesive intermediate layer;

wrapping the nonwoven outer layer about a mandrel to bring the portions of the nonwoven outer layer adjacent the opposite outer edges into abutting relation with one another; and bonding the abutting portions of the wrapped nonwoven outer layer with one another by heating the exposed portion of the adhesive layer.

2. The method of claim 1 further including providing the inner layer as an impervious sheet of polymeric material.

3. The method of claim 1 further including providing the inner layer as a nonwoven material.

4. A method of constructing a wrapped textile sleeve, comprising:

providing an inner layer having opposite inner edges extending lengthwise between opposite inner ends;

providing an outer layer having opposite outer edges extending lengthwise between opposite outer ends;

sandwiching an adhesive intermediate layer between the inner layer and the outer layer to form a sandwiched portion of the adhesive layer and an exposed portion of the adhesive layer that extends beyond at least one of the opposite inner edges of the inner layer;

bonding the inner layer to the outer layer by heating the sandwiched portion of the adhesive intermediate layer;

wrapping the outer layer about a mandrel to bring the portions of the outer layer adjacent the opposite outer edges into abutting relation with one another;

bonding the abutting portions of the wrapped outer layer with one another by heating the exposed portion of the adhesive layer; and further including aligning one of said inner edges in flush relation with one of the outer edges.

5. The method of claim 4 further including bonding a radially inwardly facing inner surface of the outer layer to the exposed region of the intermediate layer and bonding the exposed region of the intermediate layer to a radially outwardly facing outer surface of the outer layer.

6. The method of claim 1 further including extending the adhesive intermediate layer beyond both of the inner edges of the inner layer to provide a pair of the exposed regions.

7. The method of claim 6 further including bonding the pair of exposed regions to one another.

8. A method of constructing a wrapped textile sleeve, comprising:

providing an inner layer having opposite inner edges extending lengthwise between opposite inner ends;

providing an outer layer having opposite outer edges extending lengthwise between opposite outer ends;

sandwiching an adhesive intermediate layer between the inner layer and the outer layer to form a sandwiched portion of the adhesive layer and an exposed portion of the adhesive layer that extends beyond at least one of the opposite inner edges of the inner layer;

bonding the inner layer to the outer layer by heating the sandwiched portion of the adhesive intermediate layer;

wrapping the outer layer about a mandrel to bring the portions of the outer layer adjacent the opposite outer edges into abutting relation with one another;

bonding the abutting portions of the wrapped outer layer with one another by heating the exposed portion of the adhesive layer; and further including providing the inner layer with EMI shielding properties.

* * * * *